US008068952B2

(12) United States Patent
Valentine et al.

(10) Patent No.: US 8,068,952 B2
(45) Date of Patent: Nov. 29, 2011

(54) INTERWORKING AMONG AUTOMOBILE BUSES, PORTABLE USER EQUIPMENT AND MOBILE NETWORKS

(75) Inventors: Eric Lee Valentine, Plano, TX (US); Walter Lee Davidson, McKinney, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 511 days.

(21) Appl. No.: 12/342,439

(22) Filed: Dec. 23, 2008

(65) Prior Publication Data

US 2010/0161171 A1 Jun. 24, 2010

(51) Int. Cl.
*G06F 19/00* (2011.01)

(52) U.S. Cl. .......................................................... 701/33

(58) Field of Classification Search .................. 455/403, 455/3.06; 340/993
See application file for complete search history.

(56) References Cited

U.S. PATENT DOCUMENTS

| | | | | |
|---|---|---|---|---|
| 5,442,553 | A * | 8/1995 | Parrillo | 455/420 |
| 2002/0041240 | A1 | 4/2002 | Ikeda et al. | |
| 2002/0164973 | A1 | 11/2002 | Janik et al. | |
| 2006/0217849 | A1 * | 9/2006 | Obradovich et al. | 701/1 |
| 2007/0156313 | A1 * | 7/2007 | Fudali et al. | 701/29 |

FOREIGN PATENT DOCUMENTS

| | | | |
|---|---|---|---|
| EP | 1 903 445 | A1 | 3/2008 |
| GB | 2 388 666 | A | 11/2003 |
| WO | WO 2006/127534 | A1 | 11/2006 |

OTHER PUBLICATIONS

FlexRay Automotive Communication Bus; Document Version 2; 2006 National Instruments Corporation; http://zone.nl.com/devzone/cda/tut/p/id/3352.

Anonymous. Method and System for Automated Personal Preference Adjustments for Traveling User. IP.COM Journal, IP.COM Inc. West Henrietta, NY, US; Nov. 19, 2002.

Nusser, R. et al. Bluetooth-based Wireless Connectivity in an Automotive Environment, Vehicular Technology Conference, 2000. IEEE VTS Fall VTC 2000, 52nd Sep. 24-28, 2000, Piscataway, NJ. USA. IEEE LNKD-DOI.

Peter J. Supplier Technology: Hand It to Nokia. Automotive Industries, Diesel & Gas Turbine Publications, US, vol. 184 No. 9, Sep. 1, 2004.

Wolfgang Kellerer et al. (Auto) Mobiie Communication in a Heterogeneous and Converged World. IEEE Personal Communications, IEEE Communications Society, US, vol. 8 No. 6; Dec. 1, 2001.

Jie Du, et al. Establishing Dynamic Virtual Roadway Loop Detectors with Lane-Level Vehicle Trajectory Data. Intelligent Transportation Systems, 2005. Proceedings. 2005 IEEE Vienna, Austria Sep. 13-16, 2005.

* cited by examiner

*Primary Examiner* — Paul N Dickson
*Assistant Examiner* — Robert A Coker
(74) *Attorney, Agent, or Firm* — Roger S. Burleigh

(57) ABSTRACT

An interworking module and method are described herein which allows information to be exchanged between a user terminal (e.g., mobile phone) and a communication bus which is installed within a vehicle. The communication bus is connected to different components (e.g., engine sensors, on-board diagnostic systems, video-audio equipment, heating-cooling equipment, stereo system, and seats) which are installed within the vehicle.

19 Claims, 3 Drawing Sheets

100
106
102
104
112
108
WIRELESS COMMUNICATION NETWORK
110

INTERWORKING AMONG AUTOMOBILE BUSES, PORTABLE USER EQUIPMENT AND MOBILE NETWORKS

TECHNICAL FIELD

The present invention relates to an interworking module which allows information to be exchanged between a user terminal (e.g., mobile phone) and a communication bus which is installed within a vehicle. The communication bus is connected to different components (e.g., engine sensors, on-board diagnostic systems, video-audio equipment, heating-cooling equipment, stereo system, and seats) which are installed within the vehicle.

BACKGROUND

Manufacturers of user terminals (e.g., mobile phones) are constantly trying to develop new applications and uses for their user terminals. One new application where a user terminal (e.g., mobile phone) can be used to download or upload information to or from different components (e.g., engine sensors, on-board diagnostic systems, video-audio equipment, heating-cooling equipment, stereo system, seats) within a vehicle is the subject of the present invention.

SUMMARY

In one aspect, the present invention provides an interworking module for use in a vehicle, where the interworking module includes one or more processors and at least one memory that includes processor-executable instructions, where the one or more processors are adapted to interface with the at least one memory and execute the processor-executable instructions to allow communications between a user terminal and a communication bus that is installed within the vehicle. The interworking module enables information (e.g., instantaneous speed, sensor output information such as heat, tire pressure etc. . . . ) to be uploaded from the communication bus by the user terminal and sent through a wireless communications network to an application server. In addition, the interworking module enables information (e.g., driver profile information, audio-video files, multicast information) to be downloaded from the user terminal to the communication bus and then used by different components (e.g., video-audio equipment, heating-cooling equipment, seats, stereo system) within the vehicle.

In another aspect, the present invention provides a method for enabling a user terminal to interface with a communication bus within a vehicle, where the method includes the steps of: (a) installing an interworking module within the vehicle; (b) connecting the interworking module to the communication bus within the vehicle; and (c) using the interworking module to allow communications between a user terminal and the communication bus. The interworking module enables information (e.g., instantaneous speed, sensor output information such as heat, tire pressure etc. . . . ) to be uploaded from the communication bus by the user terminal and sent through a wireless communications network to an application server. In addition, the interworking module enables information (e.g., driver profile information, audio-video files, multicast information) to be downloaded from the user terminal to the communication bus and then used by different components (e.g., video-audio equipment, heating-cooling equipment, seats, stereo system) within the vehicle.

In still yet another aspect, the present invention provides a vehicle and in particular a vehicle telematics system which includes a communication bus, and an interworking module that has one or more processors and at least one memory that includes processor-executable instructions, where the one or more processors are adapted to interface with the at least one memory and execute the processor-executable instructions to allow communications between a user terminal and the communication bus. The interworking module enables information (e.g., instantaneous speed, sensor output information such as heat, tire pressure etc. . . . ) to be uploaded from the communication bus by the user terminal and sent through a wireless communications network to an application server. In addition, the interworking module enables information (e.g., driver profile information, audio-video files, multicast information) to be downloaded from the user terminal to the communication bus and then used by different components (e.g., video-audio equipment, heating-cooling equipment, seats, stereo system) within the vehicle.

In yet another aspect, the present invention provides a user terminal (e.g., mobile phone) which includes a user interface, one or more processors, and at least one memory that includes processor-executable instructions, where the one or more processors are adapted to interface with the at least one memory and execute the processor-executable instructions to upload or download information from or to a communication bus via an interworking module installed within a vehicle. The interworking module enables information (e.g., instantaneous speed, sensor output information such as heat, tire pressure etc. . . . ) to be uploaded from the communication bus by the user terminal and sent through a wireless communications network to an application server. In addition, the interworking module enables information (e.g., driver profile information, audio-video files, multicast information) to be downloaded from the user terminal to the communication bus and then used by different components (e.g., video-audio equipment, heating-cooling equipment, seats, stereo system) within the vehicle.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

DESCRIPTION OF THE DRAWINGS

A more complete understanding of the present invention may be obtained by reference to the following detailed description when taken in conjunction with the accompanying drawings.

ABBREVIATIONS

Figure 1:
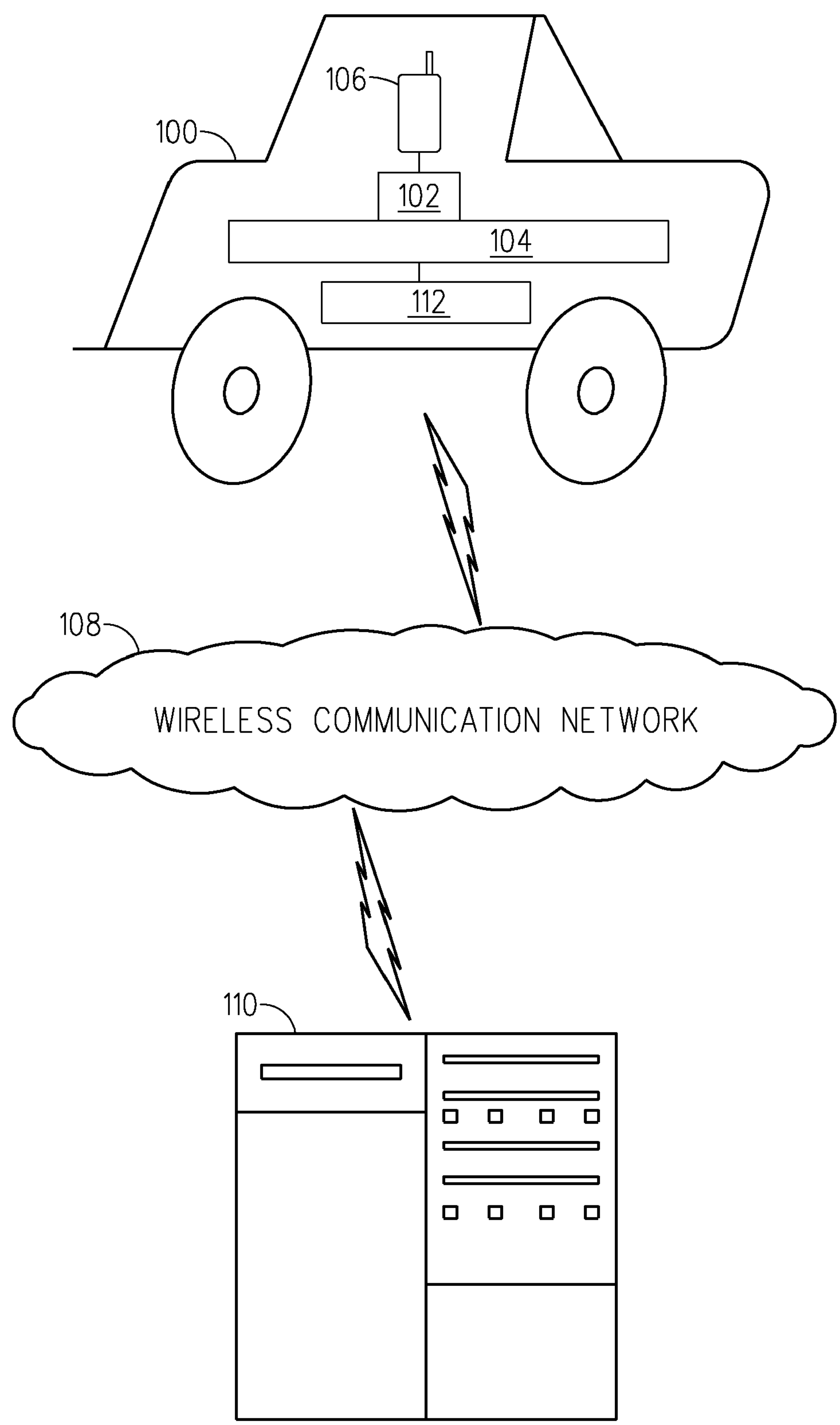
FIG. 1 is a high level diagram illustrating a vehicle (including an interworking module, a communication bus and a user terminal), a wireless communication network, and an application server in accordance with an embodiment of the present invention.

The following abbreviations are herewith defined, at least some of which are referred to within the following description of the present invention.

CAN Controller Area Network
DVD Digital Video Disk
GPS Global Positioning System
GPRS General Packet Radio Service
IMS IP Multimedia Subsystem
IMSI International Mobile Subscriber Identity
LI Local Interconnect Network
MOST Media-Oriented Systems Transport
SMS Short Message Service
USSD Unstructured Supplementary Service Data
WCDMA Wideband Code-Division Multiple Access

DETAILED DESCRIPTION

In the following detailed description, for purposes of explanation and not limitation, an exemplary vehicle and in particular an exemplary user terminal and exemplary interworking module located within the vehicle are described to provide a thorough understanding of the present invention. However, it will be apparent to one with ordinary skill in the art and having had the benefit of the present disclosure, that the present invention may be practiced in other embodiments which depart from the specific details disclosed herein. Moreover, descriptions of well-known devices, methods and materials have been omitted so as not to obscure the description of the present invention. Finally, wherever applicable, like reference numerals refer to like elements herein.

Referring to FIG. 1, there is a high level diagram illustrating a vehicle 100 (including an interworking module 102, a communication bus 104 and a user terminal 106), a wireless communication network 108, and an application server 110 in accordance with an embodiment of the present invention. As shown, the vehicle 100 has located therein the interworking module 102, the communication bus 104, and the user terminal 106 (e.g., mobile phone 106). The interworking module 102 is configured to allow information (e.g., data, content) to be exchanged between the user terminal 106 and the communication bus 104. The communication bus 104 is connected to different components 112 (e.g., engine sensors 112*a*, on-board diagnostic systems 112*b*, input device(s) 112*c*, video-audio equipment 112*d*, heating-cooling equipment 112*e*, seats 112*f*, a stereo system 112*g*) within the vehicle 100. The user terminal 106 is wirelessly connected to one or more application server(s) 110 via the wireless communication network 108.

In operation, the user terminal 106 when located within the vehicle 100 can use Bluetooth (for example) to interface with the interworking module 102 and upload information (e.g., instantaneous speed, sensor output information such as heat, tire pressure etc. . . . ) from the communication bus 104 which is connected to the different components 112 within the vehicle 100 (note: the interworking module 102 and the communication bus 104 may be considered to be part of a vehicle telematics system located within the vehicle 100). The user terminal 106 transmits the uploaded information over the wireless communications network 108 (e.g., using IMS) to the application server(s) 110 which use the uploaded information to implement end-user automobile application(s) (see FIG. 3). In addition, the user terminal 106 can use Bluetooth (for example) to interface with the interworking module 102 and download information (e.g., entertainment content, driver preferences such as climate settings, seat positions, stereo presets etc. . . . ) to the communication bus 104 which is connected to the different components 112 within the vehicle 100. For instance, the different components 112 can implement the downloaded information by playing entertainment content (downloaded information) on the video-audio equipment 112*d* or by using driver seat positions preferences (downloaded information) to adjust the position of the seats 112*g* (see FIG. 4). A more detailed discussion about an exemplary interworking module 102 and the vehicle's communication bus 104 is provided next with respect to FIG. 2.

Figure 2:
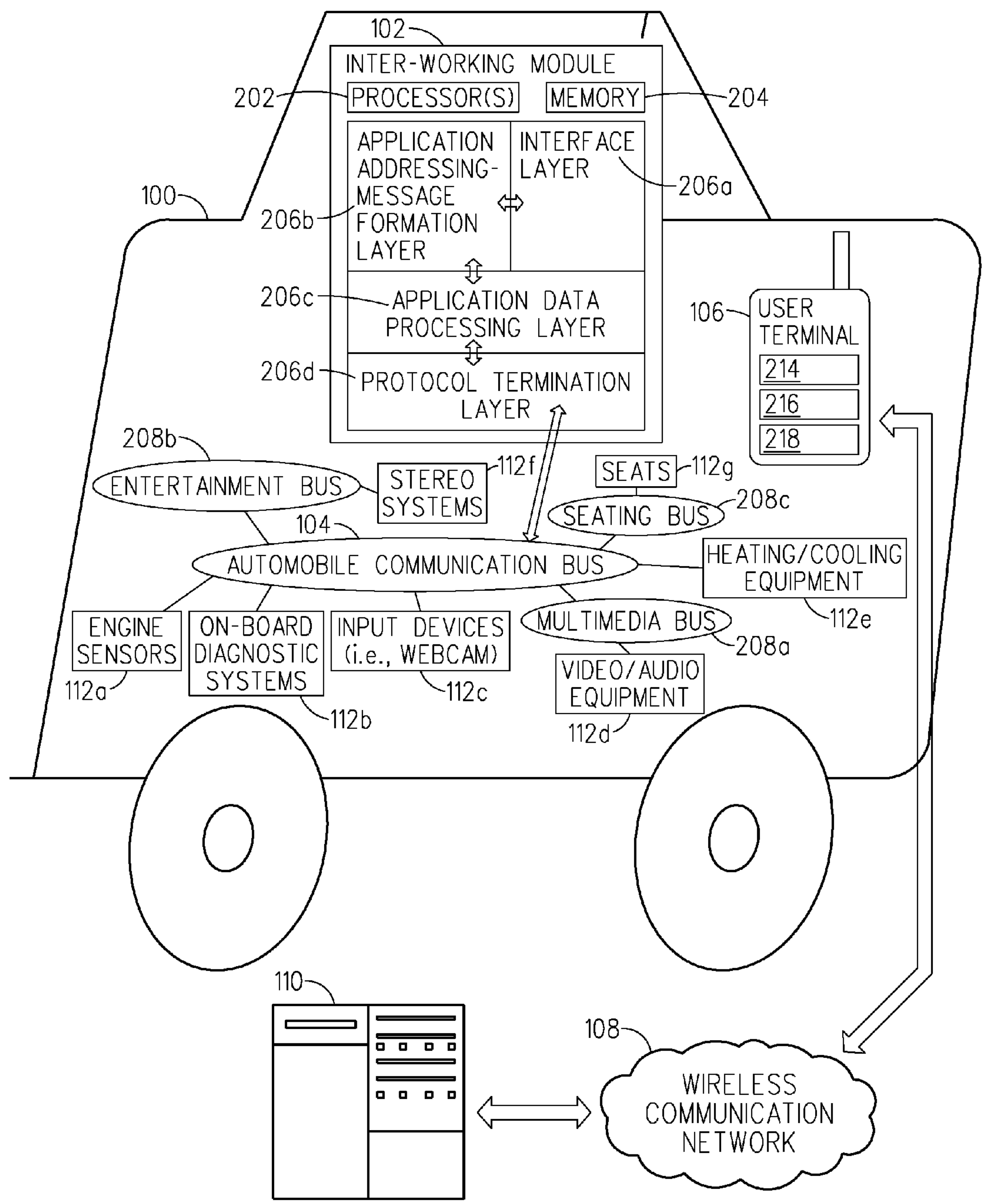
FIG. 2 is a more detailed diagram illustrating the vehicle (including the interworking module, the communication bus and the user terminal), the wireless communication network, and the application server shown in FIG. 1 in accordance with an embodiment of the present invention.

Referring to FIG. 2, there is a more detailed diagram illustrating the vehicle 100 (including the interworking module 102, the communication bus 104 and the user terminal 106), the wireless communication network 108, and the application server 110 in accordance with an embodiment of the present invention. As shown, the interworking module 102 has one or more processors 202 and at least one memory 204 (storage 204) that includes processor-executable instructions where the one or more processors 202 are adapted to interface with the memory 204 and execute the processor-executable instructions to allow communications between the user terminal 106 and the communication bus 104 that is installed within the vehicle 100 (note: the one or more processors 202 and the at least one memory 204 are implemented, at least partially, as software, firmware, hardware, or hard-coded logic). In this example, the processor(s) 202 and memory 204 interface with multiple layers including: (a) an interface layer 206*a* which can use Bluetooth (for example) to interface with the user terminal 106; (b) an application addressing-message formation layer 206*b* which interfaces with the interface layer 206*a*; (c) an application data processing layer 206*c* which interfaces with the application addressing-message formation layer 206*b*; and (d) a protocol termination layer 206*d* which functions as an interface between the application data processing layer 206*c* and the communication bus 104. The multiple layers 206*a*, 206*b*, 206*c* and 206*d* implement a communication protocol which allows communications to occur back-and-forth between the communication bus 104 (and the vehicle's components 112) and the user terminal 106.

The communication bus 104 interfaces with the vehicle's components 112 which can include for example: (a) engine sensors 112*a*; (b) on-board diagnostic systems 112*b*; (c) input device(s) 112*c* (e.g., webcam 112*c*); (d) a multimedia bus 208*a* which is connected to video-audio equipment 112*d*; (e) heating-cooling equipment 112*e*; (f) an entertainment bus 208*b* which is connected to the stereo system 112*f*; and (g) a seating bus 208*c* which is connected to seats 112*g*. Typically, a modern vehicle 102 already has the communication bus 104 and possibly sub-buses 208*a*, 208*b* and 208*c* (optional) incorporated therein which are connected to the different components 112*a*, 112*b*, 112*c*, 112*d*, 112*e*, 112*f* and 112*g*. For example, the communication bus 104 may operate according to anyone of a variety of different standards including OBD-II, CAN, and the upcoming FlexRay. Other sub-buses 208*a*, 208*b* and 208*c* may also exist within the modern vehicle 102 such as, for instance, J1850 and LIN which are used to connect many devices 112 together within, for instance, a passenger seat 112*g*. Plus, Media Oriented Systems Transport (MOST) is another sub-bus 208*a* which is used for multimedia networking of devices such as a DVD player 112*d* to many speakers within the vehicle 102. The sub-buses 208*a*, 208*b* and 208*c* (e.g., sub-networks 208*a*, 208*b* and 208*c*) are connected to the communication bus 104 within the vehicle 102.

The user terminal 106 (e.g., mobile phone 106) has a user interface 214, one or more processors 216, and at least one memory 218 (storage 218) that includes processor-executable instructions where the one or more processors 216 are adapted to interface with the memory 218 and execute the processor-executable instructions to upload or download information (vehicle information) from or to the communication bus 104 via the interworking module 102 installed within the vehicle 102 (note: the one or more processors 216 and the at least one memory 218 are implemented, at least partially, as software, firmware, hardware, or hard-coded logic). The user terminal 106 utilizes Bluetooth (or some other protocol) to interface with the interworking module 102. The user device 106 also utilizes a radio interface such as WCDMA, WiMax etc. . . . to communicate with the application server(s) 110 via the wireless communications network 108.

Figures 3, 4:
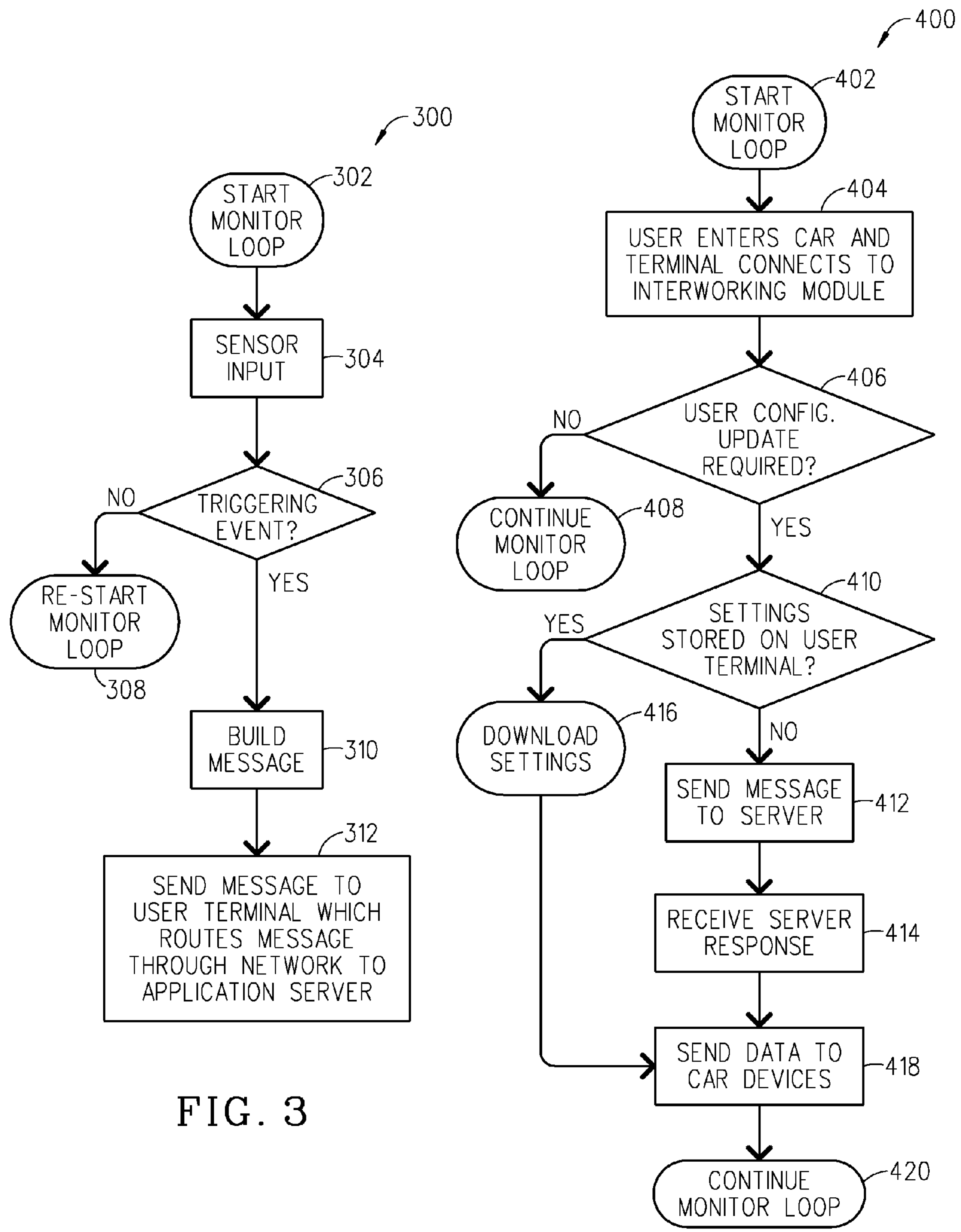
FIG. 3 is a flowchart illustrating the basic steps of a method for using the interworking module to run an uplink monitoring loop during which information is uploaded by the user terminal from the vehicle and transmitted through the wireless communication device to the application server in accordance with an embodiment of the present invention.
FIG. 4 is a flowchart illustrating the basic steps of a method for using the interworking module to run a downlink monitoring loop during which information is downloaded from the user terminal to the vehicle and then sent to different components within the vehicle in accordance with an embodiment of the present invention.

Referring to FIG. 3, there is a flowchart illustrating the basic steps of a method 300 for using the interworking module 102 to run an uplink monitoring loop in accordance with an embodiment of the present invention. In this discussion, assume the user terminal 106 is located within the vehicle 100 and is interfaced with the interworking module 102. Beginning at step 302, the interworking module 102 starts the uplink monitoring loop. At step 304, the interworking module 102 receives sensor information (vehicle information) from the communication bus 104, where the sensor information is associated with one or more of the components 112 within the vehicle 102. At step 306, the interworking module 102 and in particular the application data processing layer 206*c* therein determines if the received sensor information is classified as a triggering event. If no, then the interworking module 102 at step 308 re-starts the uplink monitoring loop by returning to step 302 (note: steps 306 and 308 are optional). If the result of step 306 is yes, then the interworking module 102 at step 310 builds a message including at least the received sensor information and possibly other information such as an application identifier, sensor type, sensor value etc. . . . At step 312, the interworking module 102 sends the message to the user terminal 106 which then uses USSD, SMS, GPRS, WCDMA etc. . . . to route the message through the wireless communications network 108 to the application server(s) 110. The application server(s) 110 use the received message which includes uploaded information to implement one or more end-user automobile application(s).

The interworking module 102 by running the uplink monitoring loop enables a wide-variety of information to be uploaded from the communication bus 104 (components 112) into the user terminal 106 and then sent through the wireless communications network 108 to the application server(s) 110. An exemplary list of several different types of information that can be uploaded into the user terminal 106 and sent to the application server(s) 110 is as follows:

Routine maintenance information:
mileage information.
sensor status.
etc. . . .
Emergency maintenance information:
tire pressure
engine temperature
oil pressure
sensor status
etc. . . .
Driver preferences (upload):
climate settings
seat position(s)
stereo presets
etc. . . .
Safe driving information:
instantaneous speed
maximum speed since most current reset
distance driven since most current reset
vehicle location*
cell phone usage
etc. . . .
Incident notification information:
vehicle location*
airbag deployment
etc. . . .
Vehicle webcam information:
video-audio stream
video file
etc. . . .

If the vehicle 100 is equipped with a GPS unit then vehicle location information if desired can be added to the message which is sent by the user terminal 106 to the application server(s) 110. Alternatively, the user equipment 106 may be GPS based and if it is then it can obtain the vehicle location and add this information to the message which is sent to the application server(s) 110. In yet another alternative, the wireless communication network 108 may be used to determine the location of the user terminal 106 and by default the location of the vehicle 100.

Upon receiving the message (information), the application server(s) 110 processes the received information per a specific end-user automobile application and depending on the results may send a notification message to a PC, another user terminal and/or emergency personnel (for example). Several exemplary end-user automobile applications are described below:

Users can receive maintenance notifications on their home or office PCs or cellular phones if their car (which may be operated by a spouse or other family member) has low tire pressure, engine heat problems etc. . . .

People (parents) can monitor the speed at which the vehicle has been operated during a specified period of time.

Authorized users and emergency personnel can receive notification of events such as airbag deployment.

If desired, the application server(s) 110 can send queries (asynchronous queries) through the user terminal 106 to the interworking module 102 to obtain data from the vehicle's communication bus 104. In this way, the application server(s) 110 can send a query to interworking module 102 and receive a response containing the requested information which could be useful for instance to maintenance personnel, emergency services personnel, parents, etc. In one case, the interworking module 102 may have its own internal user terminal (instead of user terminal 106) which could be configured to interface with the application server(s) 110.

Referring to FIG. 4, there is a flowchart illustrating the basic steps of a method 400 for using the interworking module 102 to run a downlink monitoring loop in accordance with an embodiment of the present invention. Beginning at step 402, the interworking module 102 starts the downlink monitoring loop. At step 404, the interworking module 102 determines that the user terminal 106 and the associated user (driver or passenger) entered the vehicle 100 when the user terminal 106 which has Bluetooth or some other interface connects to the interworking module 102. At step 406, the interworking module 102 determines if the user terminal 106 has user configuration data (e.g., seat positions, stereo presets, climate control settings, alarm thresholds (speed limits, distance thresholds etc. . . . )) which indicates an update needs to be made to one or more of the components 112 in the vehicle 100. If no, the interworking module 102 at step 408 continues the downlink monitoring loop (return to step 402). If yes, then the interworking module 102 at step 410 determines if the settings associated with the user configuration data are currently stored within the user terminal 106. For example, it is possible to maintain a driver or passenger's person profile on the user terminal 106 so that, for instance, seat positions, entertainment systems and heating-cooling systems can be customized. If the result of step 410 is no, then the interworking module 102 at step 412 sends a message via the user terminal 106 to a remote device (e.g., application server 110, user PC) to obtain at step 414 the settings associated with the user configuration data from the remote device. The message may contain an IMSI, hashed IMSI or some other key to uniquely identify the user. If the result of step 410 is yes, then the interworking module 102 at step 416 downloads the settings associated with the user configuration data from the user terminal 106. After step 414 or 416, the interworking module 102 at step 418 sends the user settings via the communication bus 104 to the required components 112 in the vehicle 102 so that those components 112 can be configured according to a preference of the user. For example, the interworking module 102 puts the user settings on the communication bus 104 as if the data came from manual user input, i.e., seat controls, climate controls etc. . . . to configure the component(s) 112. At step 420, the interworking module 102 continues the downlink monitoring loop by returning to step 402. In the above example, the interworking module 102 can determine that the user of the user terminal 106 is a driver or a passenger by receiving a prompt from the user terminal 106 or based on a docking position of the user terminal 106. If desired, the interworking module 102 can interface with multiple user terminals 106 at the same time so as to download the user settings from the driver and one or more passengers.

The above example where the interworking module 102 downloads user settings from the user terminal 106 to adjust or configure one or more components 112 (e.g., heating-cooling equipment 112*e*, seats 112*f*) is just one possible application of the present invention. If desired, the interworking module 102 can also download other types of information (content) from the user terminal 106 to the different components 112 in the vehicle 100. In this case, the application server(s) 110 or other servers can deliver information (content) via the wireless communication network 108 to the user terminal 106 and then the interworking module 102 can deliver that information (content) to the relevant buses 104, 208*a*, 208*b* and 208*c* within the vehicle 100. This would allow, for example, cellular network multicast information such as soccer game audio and video to be delivered to the video-audio equipment 112*d* (multimedia network). In addition, this would allow for other types of information (content) such as audio-video data files, driver-passenger information like text messages and voice calls to be delivered to different components 112 in the vehicle 100.

In the above examples associated with FIGS. 3 and 4, two different user configurations have been described which are related to an uplink monitoring loop and a downlink monitoring loop for a driver and passenger of the vehicle 100. If desired, the interworking module 102 can have a third user configuration in which it stores the profile of an owner of the vehicle 100. Thus, if none of the identities of the user terminals 106 that are currently interfaced to the interworking module 102 during the aforementioned step 404 match the stored identity of the user terminal 106 that is specified as being associated with the owner of the vehicle 100, then the interworking module 102 would also request an updated owner profile information through any available user terminal 106 as described above in method 400. In this way, if the owner's user terminal 106 is not present in the vehicle 100 then the owner could prevent the vehicle 100 from operating or control other aspects of the vehicle 100 depending for example on the identities of the current driver and/or passengers.

From the foregoing, it should be appreciated that the interworking module 102 has physical and logical terminations which allow communications to be exchanged between the user terminal 106 and the communication bus 104 which is installed within the vehicle 100. As such, the interworking module 102 is an effective platform that can be used to support a wide-variety of end-user automobile applications several of which have been described herein. The interworking module 102 has another advantage in that cellular operators can obtain additional revenue by offering this service and the associated automobile applications to the owners of vehicles 100, particularly, but not exclusively to parents which can have near-instant access to information related to the operation of their vehicle 100.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the spirit of the invention as set forth and defined by the following claims.

The invention claimed is:

1. An interworking module for use in a vehicle, said interworking module comprising:

one or more processors; and at least one memory that includes processor-executable instructions, where the one or more processors are adapted to interface with the at least one memory and execute the processor-executable instructions to:

allow communications between a user terminal and a communication bus that is installed within the vehicle;

implement a first user configuration which comprises:

running an uplink monitoring loop that includes:

receiving sensor information from the communication bus, where the sensor information is related to one or more components within the vehicle;

building a message including the received sensor information; and sending the message to the user terminal which then routes the message through a wireless communication network to an application server;

implement a second user configuration which comprises:

running a downlink monitoring loop that includes:

determining that the user terminal entered the vehicle;

determining if the user terminal has user configuration data which indicates an update needs to be made to one or more components in the vehicle;

if no, then re-starting the downlink monitoring loop;

if yes; then determining if settings associated with the user configuration data are currently stored within the user terminal;

if no, then sending a message to the application server to obtain the settings associated with the user configuration data; and if yes or after receiving the settings associated with the user configuration data from the application server, then sending the settings over the communication bus to the one or more components in the vehicle so the one or more components will be configured according to a preference of a user of the user terminal; and implement a third user configuration which comprises:

storing a profile of an owner of the vehicle;

determining if an identity of the user terminal that entered the vehicle matches a stored identity of a user terminal specified as being associated with the owner of the vehicle;

if no, requesting an updated owner profile through the user terminal that entered the vehicle by:

sending a message to the application server to obtain the updated owner profile;

receiving the updated owner profile which contains user configuration data;

sending settings associated with the updated owner profile over the communication bus to the one or more components in the vehicle so the one or more components will be configured according to a preference of the owner, wherein the preference of the owner prevents the vehicle from operating or controls other aspects of the vehicle depending on an identity of the user terminal that entered the vehicle.

2. The interworking module of claim 1, wherein the one or more processors and the at least one memory interface with a plurality of layers that include:

an interface layer which interfaces with the user terminal;

application addressing-message formation layer which interfaces with the interface layer;

an application data processing layer which interfaces with the application addressing-message formation layer; and a protocol termination layer which interfaces with the application data processing layer and the communication bus that is installed within the vehicle.

3. The interworking module of claim 2, wherein the interface layer utilizes Bluetooth technology to interface with the user terminal.

4. The interworking module of claim 1, wherein the communication bus also interfaces with at least one of the following:

a multimedia bus;

an entertainment bus;

a seating bus;

a plurality of engine sensors;

at least one on-board diagnostic systems;

at least one input device;

video-audio equipment;

heating-cooling equipment;

a stereo system; and seats.

5. The interworking module of claim 1, wherein the one or more processors further execute the processor-executable instructions wherein while running the uplink monitoring loop and after receiving the sensor information a determination is made to determine if the received sensor information classifies as a triggering event, wherein if the result is no then re-start the uplink monitoring loop, and wherein if the result is yes then build the message including the received sensor information and send the message to the user terminal which then routes the message through the wireless communication network to the application server.

6. A method for enabling a user terminal to interface with a communication bus within a vehicle, said method comprising the steps of:

installing an interworking module within the vehicle;

connecting the interworking module to the communication bus within the vehicle;

using the interworking module to allow communications between a user terminal and the communication bus; and implementing a first user configuration which comprises:

running an uplink monitoring loop which includes the steps of:

receiving sensor information from the communication bus, where the sensor information is related to one or more components within the vehicle;

building a message including the received sensor information; and sending the message to the user terminal which then routes the message through a communication network to an application server;

implementing a second user configuration which comprises:

running a downlink monitoring loop that includes:

determining that the user terminal entered the vehicle;

determining if the user terminal has user configuration data which indicates an update needs to be made to one or more components in the vehicle;

if no, then re-starting the downlink monitoring loop;

if yes, then determining if settings associated with the user configuration data are currently stored within the user terminal;

if no, then sending a message to the application server to obtain the settings associated with the user configuration data; and if yes or after receiving the settings associated with the user configuration data from the application server, then sending the settings over the communication bus to the one or more components in the vehicle so the one or more components will be configured according to a preference of a user of the user terminal; and implementing a third user configuration which comprises:

storing a profile of an owner of the vehicle;

determining if an identity of the user terminal that entered the vehicle matches a stored identity of a user terminal specified as being associated with the owner of the vehicle;

if no, requesting an updated owner profile through the user terminal that entered the vehicle by:

sending a message to the application server to obtain the updated owner profile;

receiving the updated owner profile which contains user configuration data;

sending settings associated with the updated owner profile over the communication bus to the one or more components in the vehicle so the one or more components will be configured according to a preference of the owner, wherein the preference of the owner prevents the vehicle from operating or controls other aspects of the vehicle depending on an identity of the user terminal that entered the vehicle.

7. The method of claim 6, wherein the sensor information is routine maintenance information including at least one of mileage information and sensor status.

8. The method of claim 6, wherein the sensor information is emergency maintenance information including at least one of tire pressure, engine temperature, oil pressure and sensor status.

9. The method of claim 6, wherein the sensor information is driver preference information including at least one of climate settings, a seat position, and stereo presets.

10. The method of claim 6, wherein the sensor information is safe driving information including at least one of instantaneous speed, maximum speed since most current reset, distance driven since most current reset, vehicle location, and cell phone usage.

11. The method of claim 6, wherein the sensor information is incident notification information including at least one of vehicle location, and airbag deployment.

12. The method of claim 6, wherein the sensor information is vehicle webcam information including at least one of a video stream, and a video file.

13. The method of claim 6, wherein the application server processes the sensor information in the received message per a specific application and sends a notification message to at least one of a personal computer, another user terminal and emergency personnel.

14. The method of claim 6, wherein the application server sends a query to the interworking module to obtain data from the communication bus.

15. The method of claim 6, wherein the step of running the downlink monitoring loop further includes the step of:

downloading information from the user terminal to the communication bus within the vehicle.

16. The method of claim 15, wherein the downloaded information is driver-passenger information including at least one of a text message, and a voice call.

17. The method of claim 15, wherein the downloaded information is entertainment content including at least one of an audio-video file, and a multicast information.

18. The method of claim 15, wherein the downloaded information is driver profile information including at least one of seat position, stereo presets, climate control settings, and alarm thresholds.

19. A vehicle telematics system, comprising:

a communication bus; and an interworking module that includes:

one or more processors; and at least one memory that includes processor-executable instructions, where the one or more processors are adapted to interface with the at least one memory and execute the processor-executable instructions to:

allow communications between a user terminal and the communication bus;

implement a first user configuration which comprises:

running an uplink monitoring loop that includes:

receiving sensor information from the communication bus, where the sensor information is related to one or more components within the vehicle;

building a message including the received sensor information; and sending the message to the user terminal which then routes the message through a wireless communication network to an application server;

implement a second user configuration which comprises:

running a downlink monitoring loop that includes:

determining that the user terminal entered the vehicle;

determining if the user terminal has user configuration data which indicates an update needs to be made to one or more components in the vehicle;

if no, then re-starting the downlink monitoring loop;

if yes, then determining if settings associated with the user configuration data are currently stored within the user terminal:

if no, then sending a message to the application server to obtain the settings associated with the user configuration data; and if yes or after receiving the settings associated with the user configuration data from the application server, then sending the settings over the communication bus to the one or more components in the vehicle so the one or more components will be configured according to a preference of a user of the user terminal; and implement a third user configuration which comprises:

storing a profile of an owner of the vehicle;

determining if an identity of the user terminal that entered the vehicle matches a stored identity of a user terminal specified as being associated with the owner of the vehicle;

if no, requesting an updated owner profile through the user terminal that entered the vehicle by:

sending a message to the application server to obtain the updated owner profile;

receiving the updated owner profile which contains user configuration data;

sending settings associated with the updated owner profile over the communication bus to the one or more components in the vehicle so the one or more components will be configured according to a preference of the owner, wherein the preference of the owner prevents the vehicle from operating or controls other aspects of the vehicle depending on an identity of the user terminal that entered the vehicle.

* * * * *